(12) United States Patent
Umekawa et al.

(10) Patent No.: US 6,832,854 B2
(45) Date of Patent: Dec. 21, 2004

(54) VEHICLE-USE ROLLING BEARING DEVICE (75) Inventors: Takahiro Umekawa, Kashiwara (JP); Teruyuki Wakisaka, Kitakatsuragi-gun (JP); Shinichirou Kashiwagi, Yao (JP)

(73) Assignee: Koyo Seiko Co., Ltd., Osaka-fu (JP)

( * ) Notice: Subject to any disclaimer, the term of this patent is extended or adjusted under 35 U.S.C. 154(b) by 45 days.

(21) Appl. No.: 10/346,545

(22) Filed: Jan. 17, 2003

(65) Prior Publication Data
US 2003/0138176 A1 Jul. 24, 2003

(30) Foreign Application Priority Data
Jan. 18, 2002 (JP) .................... P2002-009623

(51) Int. Cl.[7] .............................................. F16C 19/08
(52) U.S. Cl. ...................................... 384/544; 384/537
(58) Field of Search ................................ 384/544, 589, 384/537; 29/898.07, 898.061, 898.062

(56) References Cited

U.S. PATENT DOCUMENTS

| 5,822,859 A | * 10/1998 | Kessen et al. ......... 29/898.061 |
| 5,822,860 A | * 10/1998 | Wadsworth-Dubbert et al. ..................... 29/898.061 |
| 5,975,765 A | * 11/1999 | Kawamura ................... 384/537 |
| 6,105,251 A | * 8/2000 | Payen .................... 29/898.066 |
| 6,363,799 B1 | 4/2002 | Toda et al. |
| 6,398,419 B1 | 6/2002 | Kashiwagi et al. |
| 6,443,622 B1 | * 9/2002 | Webb et al. ................. 384/448 |
| 6,464,399 B1 | * 10/2002 | Novak et al. ............... 384/477 |
| 6,715,926 B2 | * 4/2004 | Tajima et al. ............... 384/544 |

* cited by examiner

Primary Examiner—Thomas R. Hannon
(74) Attorney, Agent, or Firm—Jordan and Hamburg LLP (57) ABSTRACT

A rolling bearing device comprising an outer ring member, an inner ring member concentric with the outer ring member in the diameter direction, a plurality of rolling elements disposed so as to freely roll between the outer ring member and the inner ring member, and an axial member which is inserted into the center hole of the inner ring member and which has a flange outward in the diameter direction on the outer peripheral surface thereof, wherein the inner ring member has a curved chamfer on its end surface on the inner peripheral surface side thereof, the axial member is caulked to the end surface of the inner ring member, the amount of decentering between the center of the inner ring members in the diameter direction and the center of the chamfer in the diameter direction is set to the range of over 0 $\mu$m and not more than 200 $\mu$m.

6 Claims, 6 Drawing Sheets

VEHICLE-USE ROLLING BEARING DEVICE

BACKGROUND OF THE INVENTION

The present invention relates to a vehicle-use rolling bearing device.

In such a rolling bearing device, inner ring members are arranged so as to rotate around the axis thereof via balls on an outer ring member supported in a non-rotatable manner on the vehicle side. A hub shaft has a hub flange to which a brake disk and a tire wheel are attached. The hub shaft is press-fitted into the inner ring members from one side of the axial direction. The other end of the hub shaft in the axial direction is caulked on an outer end surface of an inner ring member by roll-caulking with a caulking tool. As a result, the inner ring members and the hub shaft integrally rotate around the axis, and the balls are provided with a predetermined pre-load. In the case of the above-mentioned rolling bearing device, the brake disk and the tire wheel may cause face deflection, which may lead to the phenomena such as brake judder or brake noise.

SUMMERY OF THE INVENTION

The rolling bearing device of the present invention comprises: an outer ring member; an inner ring member which is arranged inside the outer ring member in a diameter direction in such a manner as to be concentric with the outer ring member and which has a center hole penetrating through the inner ring member in an axial direction; a plurality of rolling elements disposed so as to freely roll between the outer ring member and the inner ring member; and an axial member which is inserted into the center hole of the inner ring member and which has a flange outward in the diameter direction on the outer peripheral surface of the axial member, wherein the inner ring is chamfered on the inner peripheral surface side of the end surface thereof, and the axial member is caulked to the end surface of the inner ring member. The amount of decentering between the center of the inner ring members in the diameter direction and the center of the chamfer in the diameter direction is set to the range of over 0 $\mu$m and not more than 200 $\mu$m.

Setting the amount of decentering between the center of the inner ring members in the diameter direction and the center of the chamfer in the diameter direction to the range of over 0 $\mu$m and not more than 200 $\mu$m makes it possible to limit the face deflection of the flange formed on the axial member to be not more than 20 $\mu$m when the end of the axial member is enlarged in diameter and caulked to the end surface of the inner ring members chamfered.

The present invention is preferably structured as follows: the inner ring member is composed of inner rings arranged in two rows in the axial direction, and inner ring raceway surfaces are formed on respective outer peripheral surfaces of the inner rings, two outer ring raceway surfaces in the axial direction are formed on the inner peripheral surface of the outer ring member, the rolling elements are disposed so as to freely roll on the respective inner ring raceway surfaces and the respective outer ring raceway surfaces. Of the two inner rings, on an outer end surface of the inner ring arranged on the vehicle inner side is formed the chamfer.

The foregoing and other aspects will become apparent from the following description of the invention when considered in conjunction with the accompanying drawing figures.

DETAILED DESCRIPTION

Figure 1:
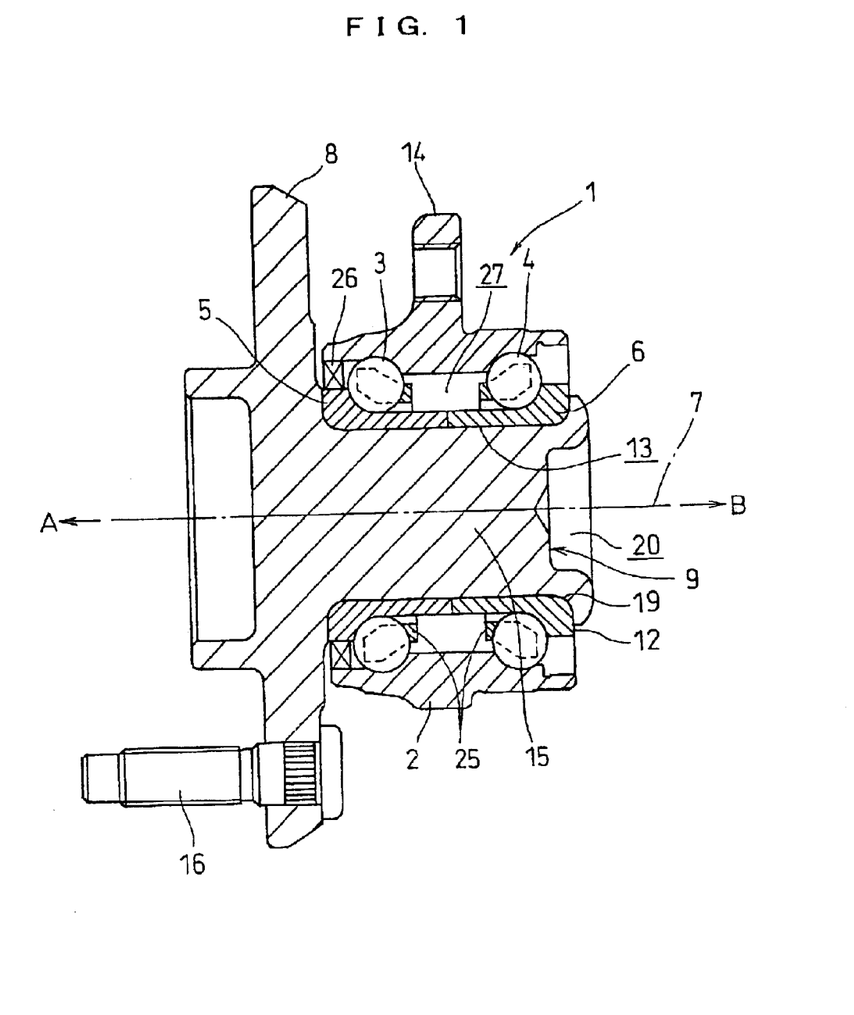
FIG. 1 is a cross sectional view showing the entire configuration of the vehicle-use rolling bearing device according to a preferred embodiment of the present invention.
Figure 2:
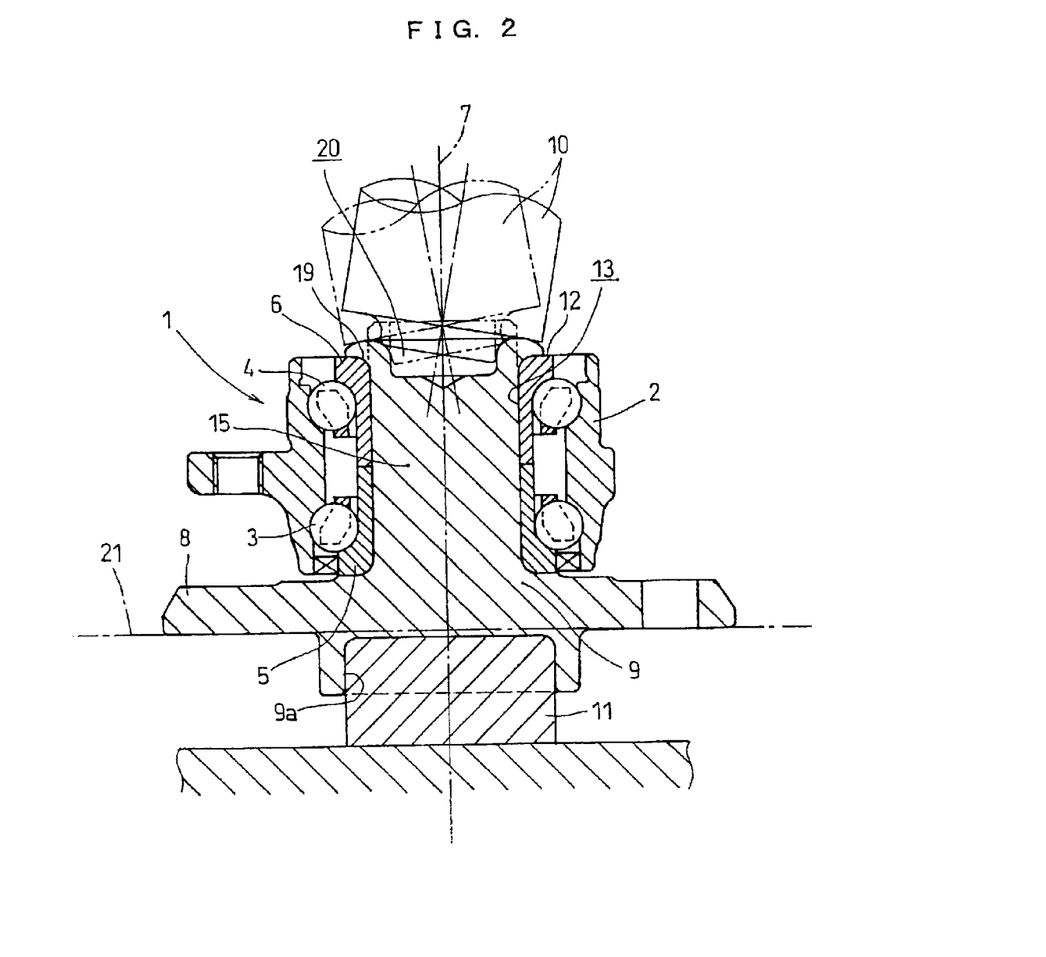
FIG. 2 is an illustration of roll-caulking the end of the hub shaft with respect to the end surfaces of the inner ring members of the same embodiment.

Referring now to drawings, FIG. 1 shows a cross sectional view of the vehicle-use rolling bearing device according to a preferred embodiment of the present invention, and FIG. 2 shows a cross sectional view of the rolling bearing device to be used to explain a caulking process. The rolling bearing device 1 has a configuration used for the driven wheel side of the vehicle.

The rolling bearing device 1 is composed of an outer ring member 2 which is attached in a non-rotatable manner to, e.g. a knuckle as the supporting member incorporated into the vehicle, inner ring members 5 and 6 supported to be rotatable around the axis 7 via a plurality of balls 3 and 4 arranged as rolling elements in two rows in the axial direction on the outer ring member 2, and a hub shaft 9 as an axial member which is press-fitted into the center hole 13 of the inner ring members 5 and 6. The balls 3 and 4 are held one by one inside the pockets in a rollable manner in the circumferential direction of the crown-shaped cage 25. Numeral 26 designates a sealing member for sealing an annular bearing space 27 between the outer ring member 2 and the inner ring members 5 and 6 on one side A (the vehicle outer side).

The outer ring member 2 has an annular supporting flange 14 protruding outward in the diameter direction, and the supporting flange 14 is fixed to the knuckle, not shown, with mounting bolts, thereby supporting the outer ring member 2 on the vehicle side in a non-rotatable manner.

The inner ring members 5 and 6 are arranged in a pair in the axial direction inside the outer ring member 2 in the diameter direction so as to be concentric with the outer ring member 2. The center hole 13 of the inner ring members 5 and 6 penetrates through in the axial direction. The inner ring raceway surface for the balls 3 is formed on the outer peripheral surface of the inner ring member 5 on the vehicle outer side A and the inner ring raceway surface for the balls 4 is formed on the outer peripheral surface of the inner ring member 6 on the vehicle inner side B. The outer ring raceway surfaces for these balls 3 and 4 are formed on the inner peripheral surface of the outer ring member 2.

The hub shaft 9 has a main body 15 having a solid cross section which is press-fitted into the center hole 13 of the inner ring members 5 and 6. The hub shaft 9 has a protruding portion projecting from the inner ring member 5 towards the vehicle outer side A, and also has a hub flange 8 formed on the outer peripheral surface of the protruding portion in such a manner as to project outward in the diameter direction. A brake disk and a tire wheel, which are not shown, are laid on the hub flange 8 on the side surface of the vehicle outer side. The brake disk and the tire wheel thus laid are fixed to the hub flange 8 by hub bolts 16.

Figure 3:
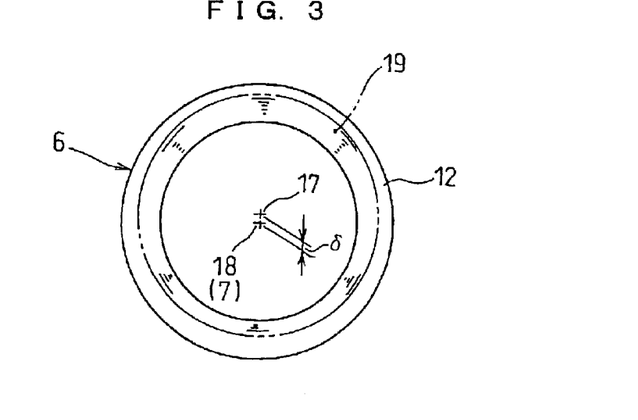
FIG. 3 is a schematic diagram showing the decentering state between the center of the chamfer in the diameter direction and the center of the inner ring member in the diameter direction.

The outer end surface 12 of the inner ring member 6 on the vehicle outer side has a curved chamfer 19 on its inner peripheral surface side. As shown in FIG. 3, the amount of decentering δ between the center 18 of the inner ring member 6 in the diameter direction (to be more specific, the center of the inner diameter cylindrical surface of the inner ring member 6) and the center 17 of the chamfer 19 in the diameter direction is set to the range of over 0 μm and not more than 200 μm.

The hub shaft 9 has a caulking concave portion 20 formed at the end of the other side B. The outer peripheral portion of the caulking concave portion 20 is deformed outward in the diameter direction to be caulked to the outer end surface 12 of the inner ring member 6. This caulking integrates the inner ring members 5 and 6 and the hub shaft 9 both in the axial direction and in the circumferential direction, and a predetermined pre-load is given to the balls 3 and 4.

In the rolling bearing device 1 having the above structure, the balls 3 and 4 are incorporated into the outer ring member 2. Then, the inner ring members 5 and 6 are incorporated into the outer ring member 2 from both sides in the axial direction via the balls 3 and 4. The main body 15 of the hub shaft 9 is press-fitted into the center hole 13 of the inner ring members 5 and 6 from the vehicle outer side A.

As shown in FIG. 2, the hub shaft 9 is supported by the supporting base 11 by engaging the concave portion 9a with the supporting base 11. A caulking tool 10 is engaged with the caulking concave portion 20 formed at the end of the hub shaft 9 on the vehicle inner side B. The caulking tool 10 is rolled around the axis 7, whereby the end of the hub shaft 9 is caulked to the end surface 12 of the inner ring member 6 on the vehicle inner side B.

It has been confirmed by experiments that the amount of decentering δ between the center 17 of the chamfer 19 in the diameter direction and the center 18 of the inner ring member 6 in the inner diameter direction on the end surface 12 of the inner ring member 6 has the following relations with the amount of deflection of the hub flange 8 from a reference plane 21 after the roll-caulking.

When the hub flange 8 has an amount of deflection of 20 μm or below, the amount of decentering δ is 200 μm or below.

When the hub flange 8 has an amount of deflection of 15 μm or below, the amount of decentering δ is 150 μm or below.

When the hub flange 8 has an amount of deflection of 10 μm or below, the amount of decentering δ is 100 μm or below.

From the above results, when the amount of deflection of the hub flange 8 from the reference plane 21 is desirably to be restricted to 20 μm or below in the case of roll-caulking working step, it can be achieved by restricting the amount of decentering δ between the center 17 of the chamfer 19 in the diameter direction and the center 18 of the inner ring member 6 in the diameter direction to 200 μm or below, that is, the range of over 0 μm and not more than 200 μm.

In the present embodiment, the rolling bearing device 1 is manufactured under the conditions that the amount of decentering δ between the center 17 of the chamfer 19 in the diameter direction and the center 18 of the inner ring member 6 in the diameter direction is set to the range of over 0 μm and not more than 200 μm. This enables the rolling bearing device 1 to have a small amount of deflection of the hub flange 8. As a result, when the rolling bearing device 1 is incorporated into a vehicle, the occurrence of face deflection of the hub flange 8 is reduced, thereby preventing the occurrence of the phenomena such as brake judder and brake noise. The limitation of the amount of decentering δ below the predetermined amount can be realized by securing precision in the working step of the inner ring member 6.

The present invention has the following applications and modifications.

Figure 4:
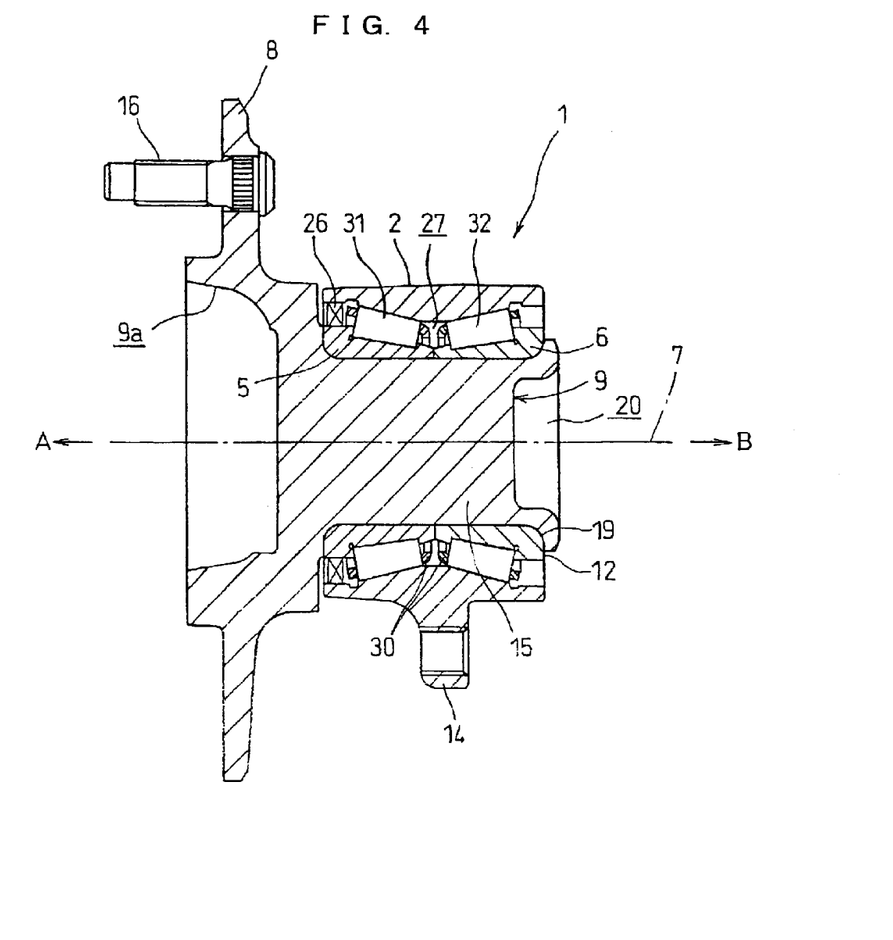
FIG. 4 is a cross sectional view showing the entire configuration of the vehicle-use rolling bearing device according to another preferred embodiment of the present invention.

(1) FIG. 4 shows the rolling bearing device 1 used on the driven wheel side. In the rolling bearing device 1, the balls 3 and 4 as rolling elements are substituted by tapered rollers 31 and 32 which are arranged at the equal intervals in the circumferential direction and held by a cage 30. The curved chamfer 19 is formed on the inner peripheral surface side of the end surface 12 in the other inner ring member 6. The amount of decentering between the center of the inner ring member 6 in the diameter direction and the center of the chamfer 19 in the diameter direction is set to the range of over 0 mm and not more than 200 mm. The other parts of the configuration are the same as in the above embodiment. In this rolling bearing device 1, the amount of decentering between the center of the inner ring member 6 in the diameter direction and the center of the chamfer 19 in the diameter direction can be set to the range of over 0 mm and not more than 200 mm, so as to caulk the end portion of the hub shaft 9 to the end surface 12 of the inner ring member 6, thereby providing the rolling bearing device 1 having the hub flange 8 causing no deflection.

Figure 5:
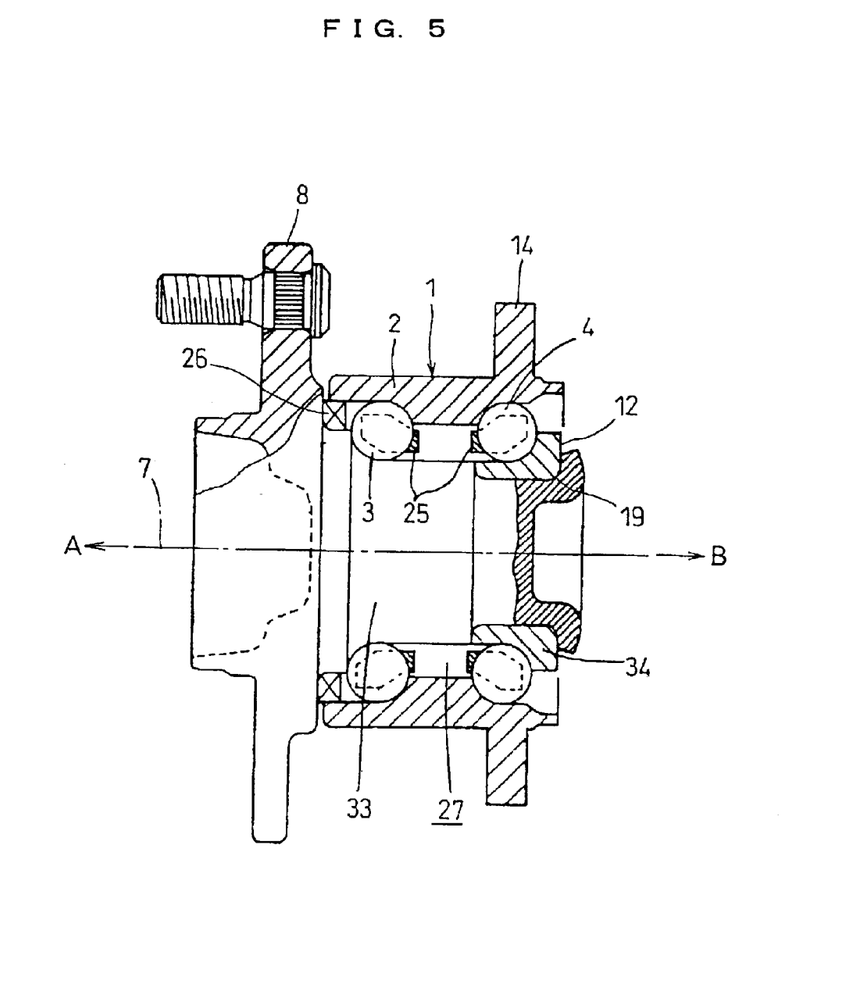
FIG. 5 is a cross sectional view showing the entire configuration of the vehicle-use rolling bearing device according to another preferred embodiment of the present invention.

(2) FIG. 5 shows the rolling bearing device 1 used on the driven wheel side. The rolling bearing device 1 includes a hub wheel 33 and a cylindrical member 34 engaged with the end portion of the hub wheel 33 on the other side B, and the hub wheel 33 and the cylindrical member 34 are rotatably supported around the axis 7 via the balls 3 and 4 arranged in two rows at the equal intervals in the circumferential direction by the cage 25 in the outer ring member 2. In the rolling bearing device 1, the hub wheel 33 and the cylindrical member 34 form the inner ring members. The inner ring raceway surfaces for the balls 3 and 4 are formed at the intermediate position of the outer peripheral surface of the hub wheel 33 and on the outer peripheral surface of the cylindrical member 34. The outer ring raceway surfaces for the balls 3 and 4 are formed on the inner peripheral surface of the outer ring member 2. The curved chamfer 19 is formed on the end surface 12 of the cylindrical member 34. The end portion of the hub wheel 33 is caulked to the end surface 12 of the cylindrical member 34.

A support flange 14 protruding outward in the diameter direction is formed on the outer peripheral surface of the outer ring member 2. The hub wheel 33 is provided with a hub flange 8 protruding outward in the diameter direction. A sealing member 26 is provided on one side A of an annular bearing space 27 between the outer ring member 2 and the inner ring member.

In the rolling bearing device 1 with such a configuration, the amount of decentering between the inner diameter cylindrical surface of the cylindrical member 34 in the diameter direction and the center of the chamfer 19 in the diameter direction is set to the range of over 0 μm and not more than 200 μm. Caulking the end of the hub wheel 33 to the end surface 12 of the cylindrical member 34 can provide a rolling bearing device 1 having the hub flange 8 causing no deflection.

Figure 6:
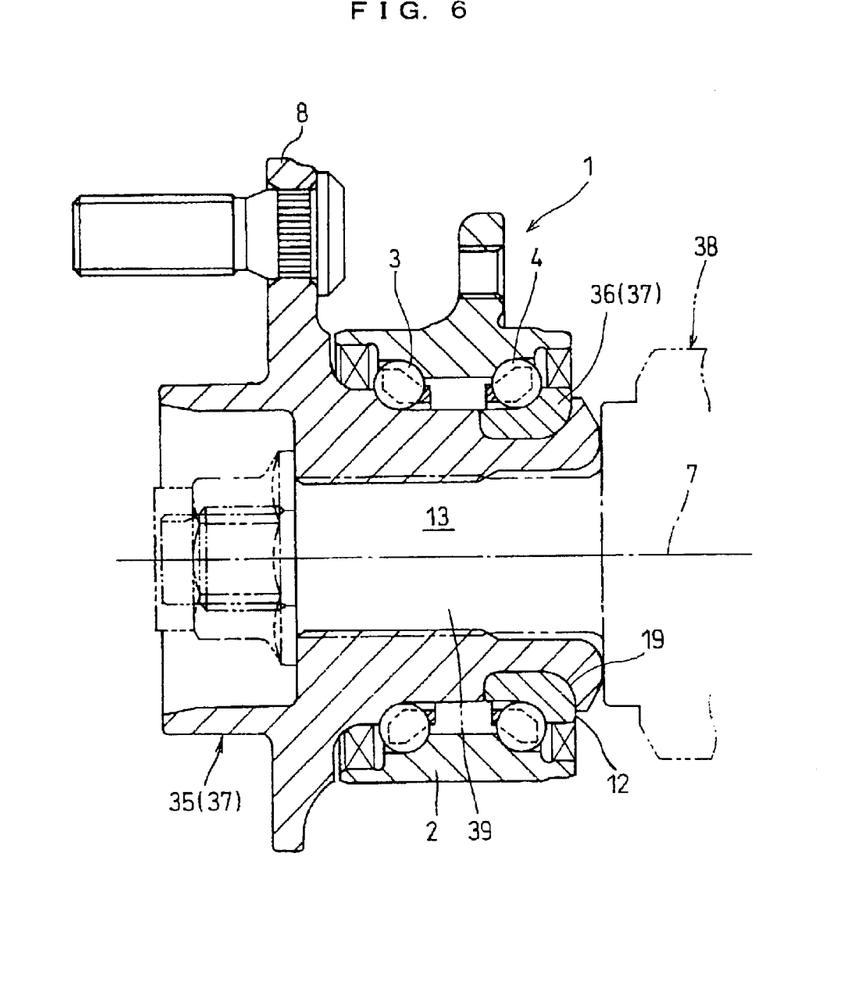
FIG. 6 is a cross sectional view showing the entire configuration of the vehicle-use rolling bearing device according to another preferred embodiment of the present invention.

(3) FIG. 6 shows the rolling bearing device 1 used on the driving wheel side. The hub wheel 35 and the cylindrical member 36 engaged with the outer peripheral surface on the other side of the hub wheel 35 form the inner ring member 37. The inner ring raceway surfaces for the balls 3 and 4 are formed at the intermediate position of the outer peripheral surface of the hub wheel 35 and on the outer peripheral surface of the cylindrical member 36. The outer ring raceway surfaces for the balls 3 and 4 are formed on the inner peripheral surface of the outer ring member 2. The hub wheel 35 is provided with a center hole 13 into which the shaft portion 39 of a constant velocity joint 38 is press-fitted, and the constant velocity joint 38 transmits driving force to the hub wheel 35 and supports the hub wheel 35 in such a manner as to freely tilt with respect to the axis 7. The end portion of the hub wheel 35 is caulked to the end surface 12 of the cylindrical member 36 having the curved chamfer 19 formed therein. In the rolling bearing device 1, the amount of decentering between the center of the hub wheel 35 in the diameter direction and the center of the chamfer 19 in the diameter direction is set to the range of over 0 mm and not more than 200 mm, and the end portion of the hub wheel 35 is caulked to the end surface 12 of the cylindrical member 36. This can provide the rolling bearing device 1 having the hub flange 8 causing no deflection.

Figure 7:
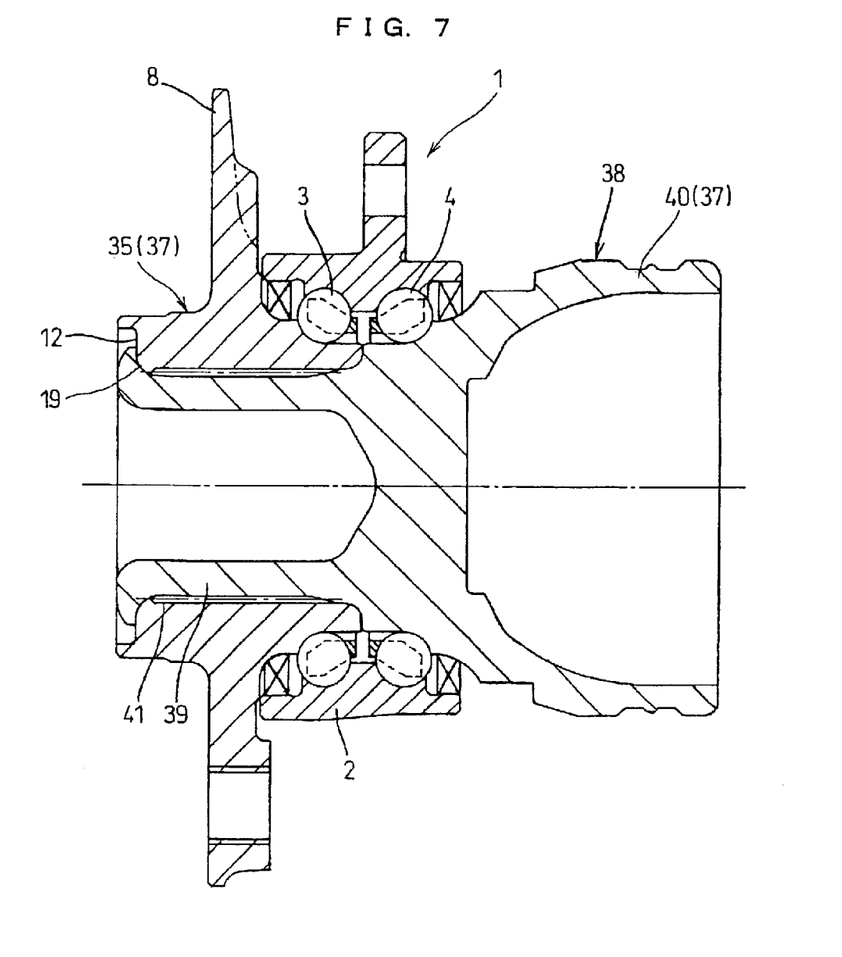
FIG. 7 is a cross sectional view showing the entire configuration of the vehicle-use rolling bearing device according to another preferred embodiment of the present invention.

(4) FIG. 7 shows the rolling bearing device 1 used on the driving wheel side. In the rolling bearing device 1, the hub wheel 35 and a cup-shaped outer ring member 40 of the constant velocity joint 38 form the inner ring member 37. The inner ring raceway surface for the balls 3 is formed on the outer peripheral surface of the hub wheel 35. The inner ring raceway surface for the other balls 4 is formed on the outer peripheral surface of the cup-shaped outer ring member 40 of the constant velocity joint 38. The outer ring raceway surfaces for both rows of the balls 3 and 4 are formed on the inner peripheral surface of the outer ring member 2. The shaft portion 39 of the constant velocity joint 38 is press-fitted into the hub wheel 35 via a spline 41. The curved chamfer 19 is formed on the inner peripheral surface side of the hub wheel 35 at one end. The end portion of the shaft portion 39 of the constant velocity joint 38 is caulked to one end surface of the hub wheel 35. In the rolling bearing device 1, the amount of decentering between the center of the hub wheel 35 in the diameter direction and the center of the chamfer 19 in the diameter direction is set to the range of over 0 mm and not more than 200 mm, and the end portion of the shaft portion 39 is caulked to the end surface 12 of the hub wheel 35. This can provide the rolling bearing device 1 having the hub flange 8 causing no deflection.

(5) In the above embodiment shown in FIGS. 1 and 2, experiments show that the amount of decentering δ between the center 17 of the chamfer 19 in the diameter direction and the center 18 of the inner ring member 6 in the diameter direction (see FIG. 3) has the above-mentioned relation with the amount of deflection of the hub flange 8 from the reference plane 21 in the case of the roll-caulking working step. In the above embodiment, when the roll-caulking working step is applied, the amount of decentering d between the center 17 of the chamfer 19 in the diameter direction and the center 18 of the inner ring member 6 in the diameter direction is set to 200 mm or below, that is, the range of over 0 mm and not more than 200 mm, in order to limit the amount of deflection of the hub flange 8 from the reference plane 21 to within 20 mm.

The present invention is not limited to this. When it is necessary to limit the amount of deflection of the hub flange 8 from the reference plane 21 to within 15 $\mu$m or 10 $\mu$m, it can be achieved by setting the amount of decentering δ between the center 17 of the chamfer 19 in the diameter direction and the center 18 of the inner ring member 6 in the diameter direction to 150 $\mu$m or below (the range of over 0 $\mu$m and not more than 150 $\mu$m) and to 100 $\mu$m or below (the range of over 0 $\mu$m and not more than 100 $\mu$m), respectively.

This can be applied to the rolling bearing device 1 with the structures shown in the above (1)–(4). Although the chamfer has a curved surface in the above-mentioned embodiments, the present invention is not restricted to this, and can be applied to a chamfer with a flat surface. Setting the amount of decentering between the center of the inner ring members in the diameter direction and the center of the chamfer in the diameter direction to 200 $\mu$m or below, that is, over 0 $\mu$m and not more than 200 $\mu$m enables to limit the face deflection of the mounting flange formed in the axial member to 20 $\mu$m or below when the end portion of the axial member is enlarged in diameter to be caulked to the end surface of the inner ring member which has been chamfered so as to have a curved plane.

As described above, when the amount of decentering between the center of the inner ring members in the diameter direction and the center of the chamfer in the diameter direction is set to the range of over 0 $\mu$m and not more than 20 $\mu$m, the face deflection of a mounting flange formed in the axial member can be limited to 20 $\mu$m or below after the end portion of the axial member is enlarged in diameter to be caulked to the end surface of the inner ring member which has been chamfered so as to have a curved plane. As a result, when a brake disk is attached to the mounting flange, the occurrence of brake judder and brake noise can be reduced.

What is claimed is:

1. A rolling bearing device comprising:
   an outer ring member;
   an inner ring member which is arranged inside the outer ring member in a diameter direction in such a manner as to be concentric with the outer ring member and which has a center hole penetrating through the inner ring member in an axial direction;
   a plurality of rolling elements disposed so as to freely roll between the outer ring member and the inner ring member; and
   an axial member which is inserted into the center hole of the inner ring member and which has a flange outward in the diameter direction on an outer peripheral surface of the axial member, wherein
   the inner ring member is chamfered on an inner peripheral surface side of an end surface thereof,
   the axial member is caulked to the end surface of the inner ring member,
   an amount of decentering between the center of the inner ring member in the diameter direction and the center of the chamfer in the diameter direction is set to a range of over 0 mm and not more than 200 mm, and
   such that an amount of deflection of said flange on said axial member is not more than 20 $\mu$m.

2. The rolling bearing device according to claim 1, wherein the inner ring member is composed of inner rings arranged in two rows in the axial direction, and inner ring raceway surfaces are formed on respective outer peripheral surfaces of the inner rings, two outer ring raceway surfaces in the axial direction are formed on an inner peripheral surface of the outer ring member, the rolling elements are disposed so as to freely roll on the respective inner ring raceway surfaces and on the respective outer ring raceway surfaces, and of the two inner rings, on an outer end surface of the inner ring arranged on the vehicle inner side is formed the chamfer.

3. The rolling bearing device according to claim 2, wherein the rolling elements are balls.

4. The rolling bearing device according to claim 2, wherein the rolling elements are tapered rollers.

5. The rolling bearing device according to claim 1, wherein the inner ring member is composed of a hub wheel and a cylindrical member engaged with an outer peripheral surface of the hub wheel on a vehicle inner side, inner ring raceway surfaces are formed respectively on an outer peripheral surface of the hub wheel on a vehicle outer side and on an outer peripheral surface of the cylindrical member, two outer ring raceway surfaces in the axial direction are formed on inner peripheral surfaces of the outer ring member, the rolling elements are disposed so as to freely roll on the respective inner ring raceway surfaces and on the respective outer ring raceway surfaces, and the chamfer is formed on an outer end surface of the cylindrical member.

6. The rolling bearing device according to claim 1 further comprising:

a constant velocity joint which includes a cup-shaped outer ring member and a shaft portion integral with the cup-shaped outer ring member, wherein the inner ring member is composed of a hub wheel and the cup-shaped outer ring member of the constant velocity joint, one of inner ring raceway surfaces is formed on an outer peripheral surface of the hub wheel, and the other of inner ring raceway surfaces is formed on an outer peripheral surface of the cup-shaped outer ring member of the constant velocity joint, two outer ring raceway surfaces in the axial direction are formed on an inner peripheral surface of the outer ring member, rolling elements are disposed so as to freely roll on the respective inner ring raceway surfaces and on the respective outer ring raceway surfaces, the chamfer is formed on one end of the hub wheel on an inner peripheral surface side, and an end portion of the shaft portion of the constant velocity joint is caulked to one end surface of the hub wheel.

* * * * *